(12) United States Patent
Hawkes et al.

(10) Patent No.: US 8,124,293 B2
(45) Date of Patent: Feb. 28, 2012

(54) ASYMMETRIC DOVETAIL INTERCONNECT FOR SOLID OXIDE FUEL CELL

(75) Inventors: Justin R. Hawkes, Vernon, CT (US); Connie E. Bird, Rocky Hill, CT (US)

(73) Assignee: UTC Power Corporation, South Windsor, CT (US)

( * ) Notice: Subject to any disclaimer, the term of this patent is extended or adjusted under 35 U.S.C. 154(b) by 0 days.

(21) Appl. No.: 12/520,628

(22) PCT Filed: Dec. 27, 2006

(86) PCT No.: PCT/US2006/049533
§ 371 (c)(1),
(2), (4) Date: Jun. 22, 2009

(87) PCT Pub. No.: WO2008/079141
PCT Pub. Date: Jul. 3, 2008

(65) Prior Publication Data
US 2010/0021791 A1 Jan. 28, 2010

(51) Int. Cl.
*H01M 8/24* (2006.01)
*H01M 2/20* (2006.01)

(52) U.S. Cl. .................................................... 429/469

(58) Field of Classification Search ............... 429/34
See application file for complete search history.

(56) References Cited

U.S. PATENT DOCUMENTS

| 6,379,831 B1 | 4/2002 | Draper et al. |
| 2002/0182472 A1 | 12/2002 | Molter et al. |
| 2003/0104263 A1* | 6/2003 | Molter et al. ............ 429/37 |
| 2004/0101733 A1 | 5/2004 | Yamanis et al. |
| 2004/0200187 A1 | 10/2004 | Warrier et al. |
| 2005/0136312 A1* | 6/2005 | Bourgeois et al. ............ 429/32 |
| 2006/0286433 A1 | 12/2006 | Rakowski et al. |

FOREIGN PATENT DOCUMENTS

| JP | 61109262 A | 5/1986 |
| WO | 2004070858 A2 | 8/2004 |

OTHER PUBLICATIONS

International Search Report for PCT/US2006/049533, dated Feb. 20, 2008.
European Search Report for Application No. 06848307.2-2119/2111664 dated Dec. 14, 2010.

* cited by examiner

*Primary Examiner* — Barbara Gilliam
*Assistant Examiner* — Stephan Essex
(74) *Attorney, Agent, or Firm* — Bachman & LaPointe, P.C.

(57) ABSTRACT

An interconnect for a solid oxide fuel cell includes a conductive structure having first portions defining a first contact zone, second portions defining a second contact zone which is spaced from the first contact zone, and intermediate portions extending between the first and second portions, wherein the intermediate portions are joined to the first portions through first corners, and wherein the intermediate portions are joined to the second portions through second corners, and wherein the first corners have a smaller radius than the second corners.

18 Claims, 3 Drawing Sheets

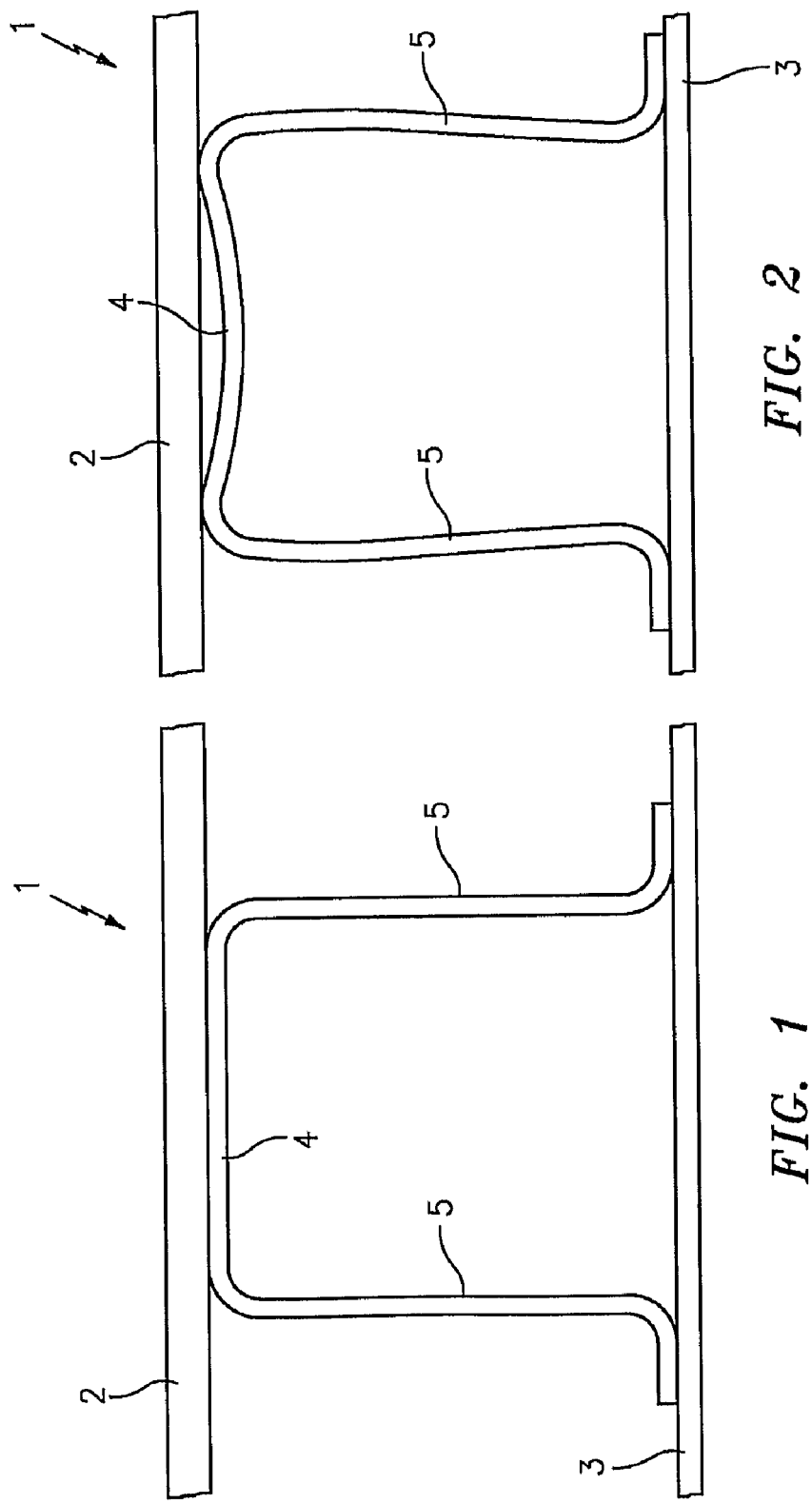

ASYMMETRIC DOVETAIL INTERCONNECT FOR SOLID OXIDE FUEL CELL

BACKGROUND OF THE INVENTION

The invention relates to solid oxide fuel cells and, more particularly, to an interconnect for solid oxide fuel cells.

Typical fuel cell power plants have alternating fuel cells and bipolar plates. The purpose of an interconnect is to pass and collect current from one cell to the next.

One structure for an interconnect is in the form of a conductive semi-rectangular structure which contacts the adjacent fuel cell and bipolar plate to pass current between them. While generally functional for the intended purpose of passing and collecting current, such an interconnect does have issues in connection with keeping good contact with the adjacent components. Further, a rectangular structure also has a high compression stiffness which can be problematic.

It is clear that a need exists for an improved interconnect which addresses these issues and which addresses the foregoing deficiencies with rectangular structures.

SUMMARY OF THE INVENTION

In accordance with the invention, the foregoing needs have been met.

According to the invention, an interconnect for a solid oxide fuel cell is provided which comprises a conductive structure comprising first portions defining a first contact zone, second portions defining a second contact zone which is spaced from the first contact zone, and intermediate portions extending between the first and second portions, wherein the intermediate portions are joined to the first portions through first corners, and wherein the intermediate portions are joined to the second portions through second corners, and wherein the first corners have a smaller radius than the second corners.

In further accordance with the invention, a solid oxide fuel cell assembly is provided comprising a fuel cell; a bipolar plate; and a conductive interconnect structure comprising first portions defining a fuel cell contact zone in contact with the fuel cell, second portions defining a bipolar plate contact zone which is spaced from the first contact zone and in contact with the bipolar plate, and intermediate portions extending between the first and second portions, wherein the intermediate portions are joined to the first portions through first corners, and wherein the intermediate portions are joined to the second portions through second corners, and wherein the first corners have a smaller radius than the second corners

BRIEF DESCRIPTION OF THE DRAWINGS

A detailed description of an embodiment of the present invention follows, with reference to the attached drawings, wherein:

FIG. 1 illustrates a prior art rectangular geometry interconnect;

FIG. 2 illustrates deformation of the interconnect of FIG. 1;

DETAILED DESCRIPTION

Figure 3:
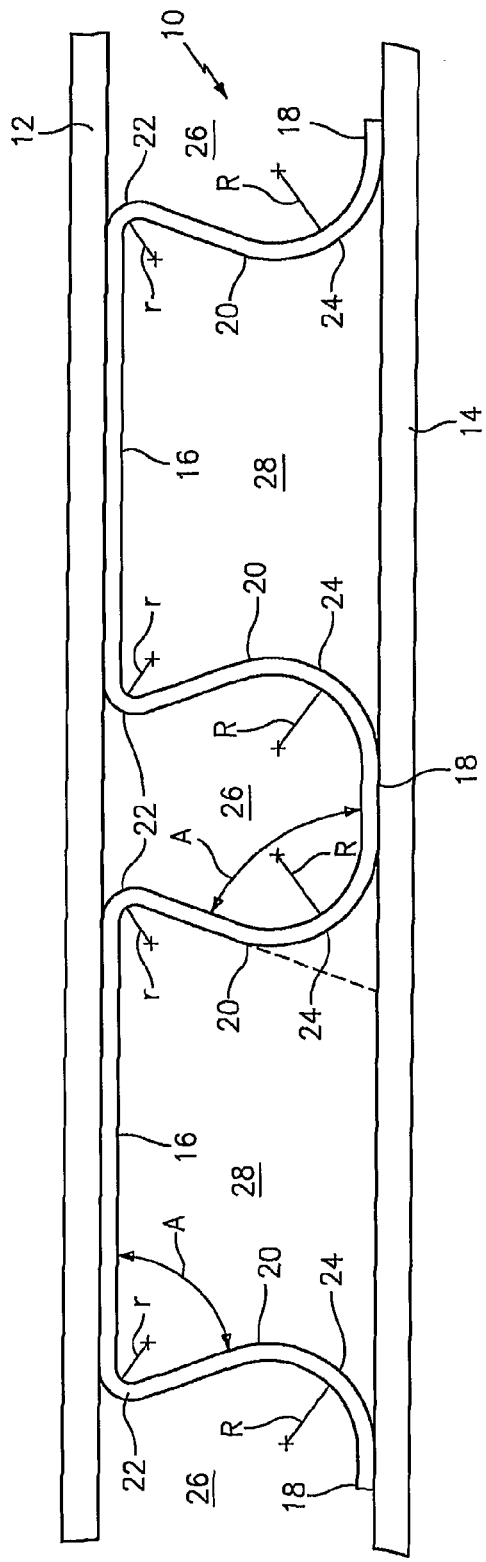
FIG. 3 illustrates an interconnect according to the present disclosure.

The present disclosure relates to an interconnect for fuel cells, more particularly for solid oxide fuel cells. The interconnect has an asymmetric dovetail shape which helps to provide desired deformation and compliance when subjected to compression.

FIGS. 1 and 2 show a semi-rectangular shape interconnect 1 which is typically used to provide electrical connection between adjacent components of a fuel cell power plant, for example between a fuel cell 2 and a bipolar plate 3, each of which is schematically illustrated in FIG. 1.

Interconnect 1 is referred to as a semi-rectangular in shape because it is formed from a material that is shaped to alternate between a first horizontal portion, a vertical intermediate portion, and second horizontal portion. This structure repeats along the specified dimension of the interconnect. Because of the repeating three-sided rectangular shape defined by this structure, it is referred to herein as a semi-rectangular interconnect.

When subjected to compression, FIG. 2 shows a typical reaction for such an interconnect 1, with the cell contacting portion 4 bowing away from cell 2 to form a concave surface facing cell 2. This is undesirable since there is little or no bond strength between the interconnect and the cell, and resulting deformation reduces contact area between interconnect 1 and cell 2. Further, the relatively straight configuration of the side or intermediate members 5 reduces the compliance of interconnect 1 under compression.

Figure 4:
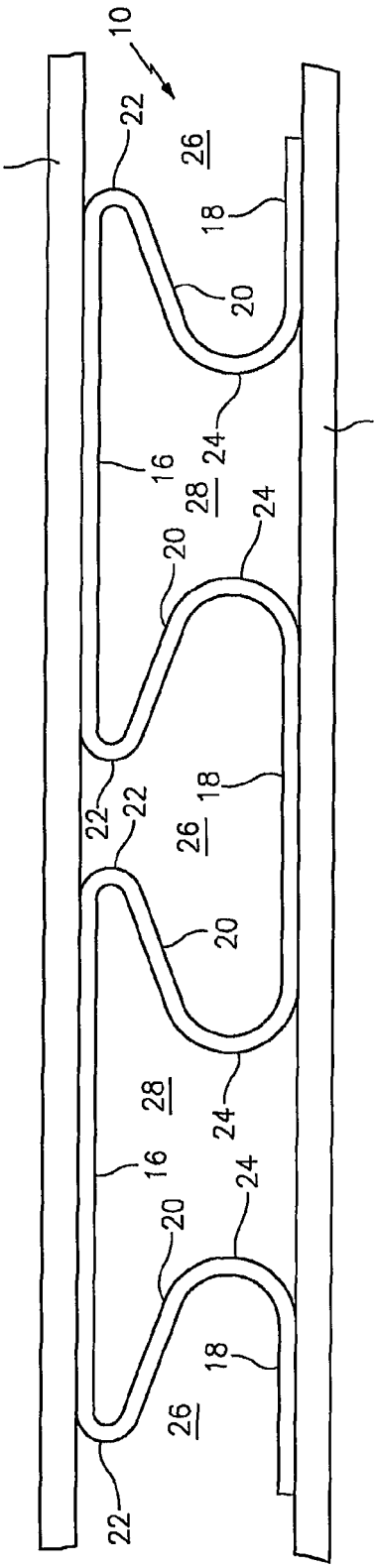
FIG. 4 illustrates deformation of the interconnect of FIG. 3.

FIGS. 3 and 4 show an interconnect 10 according to an embodiment of the invention. Interconnect 10 is positioned between adjacent components of a fuel cell power plant, for example between a fuel cell 12 and a bipolar plate 14, for the purpose of passing and collecting current from one cell to the next. Interconnect 10 in this location contacts, or interconnects, a surface of a separator or bipolar plate and an external surface of a fuel cell electrode.

FIG. 3 shows interconnect 10 having a plurality of first portions 16 which are substantially coplanar and which together define a first contact zone for contact with one fuel cell component, for example fuel cell 12. Interconnect 10 also has a plurality of second portions 18 which are also substantially coplanar and which together define a second contact zone for contact with another fuel cell component, for example bipolar plate 14.

First portions 16 and second portions 18 are connected by intermediate portions 20 which extend between first portions 16 and second portions 18 as shown. In contrast to the structure of FIG. 1, intermediate portions 20 are angled with respect to the first portions 16 and second portions 18 at an angle A of between about 20° and about 70°. Further, at the point where intermediate portions 20 meet first portions 16, they define corners 22 which are rounded structures having a first radius of curvature r. Similarly, where intermediate portions 20 meet second portions 18, they also define corners 24 which are rounded structures having a second radius of curvature R. As shown in FIG. 3, second radius of curvature R is larger than first radius of curvature r. A ratio of the radius R of corner 24 over radius r of corner 22 is therefore greater than 1 and more preferably at least about 2.5. This configuration of radii of corners 22, 24 and angle A of intermediate portions 20 serves to provide good contact of interconnect 10 with fuel cell 12, and good compliance of interconnect 10, under compression.

Taken to the extreme, it should be appreciated that corners 22, 24 could be sized so that the curves meet at a point of tangency, and in this configuration, no appreciable length would be present as intermediate portion 20. With such a configuration, the point of tangency itself would be considered to be the intermediate portion, and the angle A would be considered with respect to a line drawn through this point of tangency.

FIG. 4 shows interconnect 10 under compression, and shows that the first portions 16 defining the first contact zone remain substantially coplanar. This is desired as it helps to maintain good contact with the adjacent fuel cell 12. The larger radius R at corners 24 serves to deform upon compression in a way which does not create the deformation of first portions 16, and the contact zone with the fuel cell, which occurs in the semi-rectangular interconnect of FIGS. 1 and 2. Further, the angling of intermediate portions 20 helps to provide desirable compliance responsive to compression.

Interconnect 10 is provided in the form of sheets or strips of conductive material formed into a structure defining the spaced first and second portions. Alternating channels 26, 28 are defined between adjacent intermediate portions 20. Channels 26 open toward fuel cell 12 and channels 28 open toward bipolar plate 14. The structure of interconnect 10 allows use of wider channels, especially wider channels 28, than are possible with a rectangular configuration, and this is beneficial both from a compression stiffness and a contact area standpoint. The configuration of the present disclosure provides overlap of the first contact zone with respect to the second contact zone, and also allows for the first contact zone to be larger than the second contact zone.

FIG. 4 shows that under compression, first portions 16 partially overlap second portions 18, and this increases surface area of contact on both sides of interconnect 10.

FIGS. 3 and 4 together also illustrate that the larger radius on the non-fuel-cell contact side helps to absorb deformation of interconnect 10 without adversely impacting contact with the fuel cell.

Interconnect 10 can be provided in the form of a wire mesh, or as a metal foil, or as any other structure which may be apparent to a person skilled in the art. Within this broad range, wire mesh and metal foil are particularly suitable embodiments.

When provided as a metal foil, the material can have a very small thickness, preferably between about 0.1 mm and about 0.2 mm. Further, the metal foil can be a ferritic stainless steel. Ferritic stainless steel metal foils have thermal expansion coefficients similar to those of typical fuel cells, and this helps to minimize thermally induced stresses.

For the wire mesh structure, materials are desired which are stable in the atmosphere to which they will be exposed.

It should be appreciated that interconnect 10 will alternatingly be contacting the anode electrode or the cathode electrode of the fuel cell. On the anode side, a hydrogen-rich fuel environment will be encountered, and nickel and/or a nickel alloy is a suitable material for interconnect 10. On the cathode side, oxygen is encountered and, thus, materials are desired which are resistive to oxidation and/or which form conductive or semi-conductive scale in such an environment. Suitable materials in this environment include chromia-forming alloys such as Ni—Cr, Fe, Fe—Cr, Fe—Cr—Ni and Co based alloys, Cr based alloys, noble metals, noble alloys and combinations thereof.

Figure 5:
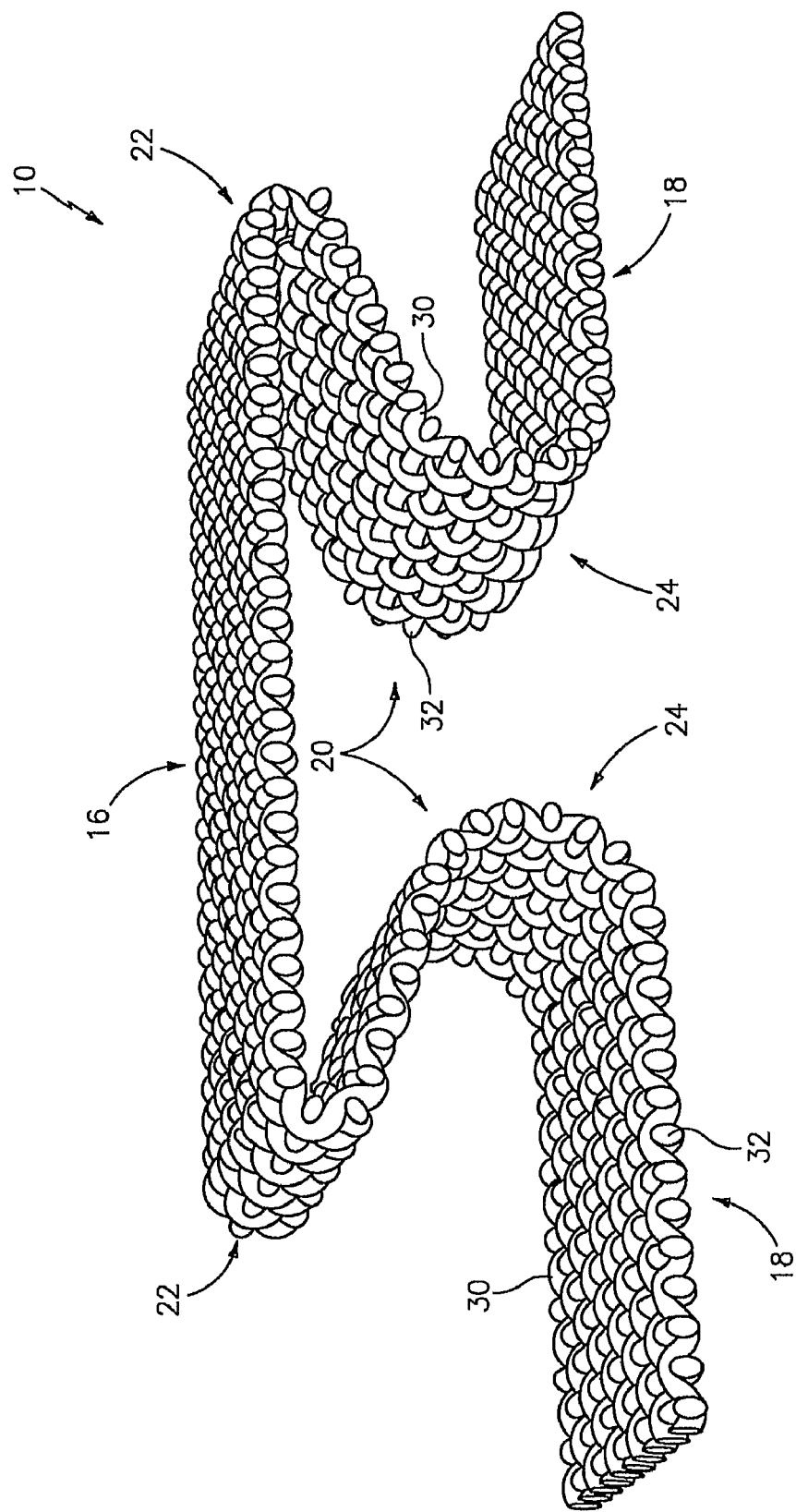
FIG. 5 illustrates an alternate embodiment.

FIG. 5 shows an embodiment of interconnect 10 defined as a woven wire mesh. As shown, the material of interconnect 10 is a woven wire structure with one group of wires 30 passing along interconnect 10, and alternating or undulating between first portion 16 and second portion 18, and with the second group of wires 32 woven through wires 30 and extending perpendicular to wires 30, in the direction of channels 26, 28. These wires 30, 32 can be made from any suitable material, suitable examples of which are identified above. Further, depending upon the environment of use of the interconnect, for example whether the interconnect will be exposed to anode reactants or cathode reactants or some other atmosphere, the wire mesh and/or metal foil can be selected to provide acceptable resistance to the expected environmental of use.

The wires 30, 32 in interconnect 10 of FIG. 5 could be the same, or could be different from each other, depending upon the aforesaid environmental issues and also upon whether the wires 30, 32 perform different functions. For example, wires 32 which run parallel to channels 26, 28 will most likely not directly carry much current and, therefore, can be made of a different material than wires 30 which will carry current, because they extend between the contact zones.

It should be appreciated that although the present disclosure is given in terms of an interconnect between a fuel cell and a bipolar plate, the interconnect of the present invention could be used in other locations as well, well within the broad scope of the present invention.

It should also be appreciated that the present disclosure is of an embodiment of the invention, and that various modifications can be made to the structures, materials and steps carried out according to the disclosure, well within the scope of the invention.

What is claimed is:

1. An interconnect for a solid oxide fuel cell, comprising:
a conductive structure comprising first portions defining a first contact zone, second portions defining a second contact zone which is spaced from the first contact zone, and intermediate portions extending between the first and second portions, wherein the intermediate portions are joined to the first portions through first corners, and wherein the intermediate portions are joined to the second portions through second corners, and wherein before compression, the first corners have a smaller radius than the second corners, and the intermediate portions are arranged at an angle with respect to the first and second portions of between 20° and 70°, wherein the second corners extend from the second contact zone to an adjacent intermediate portion along a single uniform radius curve.

2. The interconnect according to claim 1, wherein the conductive structure comprises a wire mesh.

3. The interconnect of claim 1, wherein the conductive structure comprises a metal foil.

4. The interconnect of claim 3, wherein the metal foil has a thickness of between 0.1 mm and 0.2 mm.

5. The interconnect of claim 3, wherein the metal foil comprises a ferritic stainless steel.

6. The interconnect of claim 1, wherein the first contact zone is a fuel cell contact zone and the second contact zone is bipolar plate contact zone.

7. The interconnect of claim 1, wherein a ratio of the radius of the second corners to the radius of the first corners is at least 2.5.

8. The apparatus of claim 1, wherein the first contact zone is larger than the second contact zone.

9. A solid oxide fuel cell assembly, comprising:
a fuel cell;
a bipolar plate; and
a conductive interconnect structure comprising first portions defining a fuel cell contact zone in contact with the fuel cell, second portions defining a bipolar plate contact zone which is spaced from the first contact zone and in contact with the bipolar plate, and intermediate portions extending between the first and second portions, wherein the intermediate portions are joined to the first portions through first corners, and wherein the intermediate portions are joined to the second portions through second corners, and wherein before compression the first corners have a smaller radius than the second corners, and the intermediate portions are arranged at an angle with respect to the first and second portions of between 20° and 70°, wherein the second corners extend from the second contact zone to an adjacent intermediate portion along a single uniform radius curve.

10. The assembly of claim 9, wherein the conductive structure comprises a wire mesh.

11. The assembly of claim 9, wherein the conductive structure comprises a metal foil.

12. The assembly of claim 11, wherein the metal foil has a thickness of between 0.1 mm and 0.2 mm.

13. The assembly of claim 11, wherein the metal foil comprises a ferritic stainless steel.

14. The assembly of claim 9, wherein the first contact zone is a fuel cell contact zone and the second contact zone is a bipolar plate contact zone.

15. The assembly of claim 9, wherein a ratio of the radius of the second corners to the radius of the first corners is at least 2.5.

16. The assembly of claim 9, wherein the fuel cell contact zone is larger than the bipolar plate contact zone.

17. The interconnect of claim 1, wherein longitudinal channels are defined between adjacent intermediate portions, and wherein the longitudinal channels alternatingly open toward the first contact zone and the second contact zone.

18. The assembly of claim 9, wherein longitudinal channels are defined between adjacent intermediate portions, and wherein the longitudinal channels alternatingly open toward the first contact zone and the second contact zone.

* * * * *